(12) United States Patent
Dhaliwal (10) Patent No.: US 12,536,331 B2
(45) Date of Patent: Jan. 27, 2026

(54) SYSTEM, METHOD, AND DEVICE FOR DATA ANONYMIZATION

(71) Applicant: The Toronto-Dominion Bank, Toronto (CA)

(72) Inventor: Tejinder Pal Singh Dhaliwal, Brampton (CA)

(73) Assignee: The Toronto-Dominion Bank, Toronto (CA)

(*) Notice: Subject to any disclaimer, the term of this patent is extended or adjusted under 35 U.S.C. 154(b) by 157 days.

(21) Appl. No.: 18/596,929

(22) Filed: Mar. 6, 2024

(65) Prior Publication Data

US 2025/0284846 A1 Sep. 11, 2025

(51) Int. Cl.
*G06F 21/00* (2013.01)
*G06F 21/62* (2013.01)

(52) U.S. Cl.
CPC .............................. *G06F 21/6254* (2013.01)

(58) Field of Classification Search
CPC ................................................. G06F 21/6254
See application file for complete search history.

(56) References Cited

U.S. PATENT DOCUMENTS

| | | | |
|---|---|---|---|
| 9,047,461 B2 | 6/2015 | Horst | |
| 9,059,851 B2 | 6/2015 | Movshvitz | |
| 10,242,203 B2 | 3/2019 | Shetty et al. | |
| 11,238,757 B2 | 2/2022 | Bush et al. | |
| 11,334,818 B2 | 5/2022 | Wu | |
| 11,574,308 B2 | 2/2023 | Robotham et al. | |
| 11,675,754 B2 | 6/2023 | Goel et al. | |
| 11,698,990 B2 | 7/2023 | McFall et al. | |
| 2012/0316992 A1 | 12/2012 | Oborne | |
| 2020/0242590 A1 | 7/2020 | Sarjaz et al. | |
| 2023/0385174 A1 | 11/2023 | Tokarev et al. | |

OTHER PUBLICATIONS

Kumar et al., "On anonymizing query logs via token-based hashing", WWW '07: Proceedings of the 16th international conference on World Wide Web, pp. 629-638, May 8 (Year: 2007).*
Hyland, Charles C., et al.; Multilayer networks for text analysis with multiple data types; EPJ Data Science 10.1; Jun. 28, 2021; https://epjds.epj.org/articles/epjdata/abs/2021/01/13688_2021_Article_288/13688_2021_Article_288.html.

* cited by examiner

*Primary Examiner* — Morshed Mehedi
(74) *Attorney, Agent, or Firm* — CPST Intellectual Property Inc.; Brett J. Slaney; Amy Scouten (57) ABSTRACT

A device, method, and system for treating data from legacy infrastructure is disclosed. Illustratively, the device memory stores computer executable instructions that when executed by the processor cause the processor to provide a dataset comprising a plurality of characters and provide a token table for tokenizing datasets. The token table includes mappings that define replacement tokens for characters in datasets. The instructions cause the processor to generate a tokenized dataset based on the dataset by (1) for each contiguous sequence of letter characters of the plurality of characters, determining a respective letter token having the same length as the respective contiguous sequence, and (2) generate the tokenized dataset by replacing each contiguous sequence of letter characters of the plurality of characters with the determined respective letter token.

20 Claims, 8 Drawing Sheets

Table 40:

| Original Value | Token Value |
|---|---|
| a | x |
| jim | aac |
| toronto | aaaabbx |

Table 42:

| Original Value | Token Value |
|---|---|
| 0 | 0 |
| 1 | 5 |
| ... | ... |
| 9999999 | 7673546 |

An 18-digit numeric value is divided in subsets (44):

| 3 | 5 | 2 | 4 | 2 | 7 | 5 | 2 | 3 | 7 | 3 | 2 | 1 | 9 | 7 | 8 | 3 | 4 |

0-6 | 7-13 | 14-17

Table 46:

| Original Value | Token Value |
|---|---|
| 4539275237321978 | 1111111111111111 |
| 3546756298 | 2367489736 |
| L6X0L5 | M4N3P2 |
| 220115x346 | 89746m567 |
| 4.12 | 8.43 |

SYSTEM, METHOD, AND DEVICE FOR DATA ANONYMIZATION

TECHNICAL FIELD

The following relates generally to methods of anonymizing data.

BACKGROUND

Existing digital architectures may impose constraints on data access and these constraints can result in burdensome processes.

Constraints on data access in some approaches have resulted in the application of anonymization processes to generate anonymized data to provide to users lacking access to the data. Existing anonymization approaches can be poorly implemented, for example, they can prevent a data engineer without access to the sensitive data from understanding how sensitive (alternatively referred to as "production" data) is formatted, and other characteristics of the production data. As knowing the production data characteristics can be a prerequisite for performing certain tasks, users can waste considerable time navigating data access processes (e.g., receiving permission to access the production data to generate test data) without performing any substantive tasks, or in time sensitive application, data stewards work around the existing constraints and show the other user the access controlled data (e.g., in a joint in-person debug session).

The anonymization techniques can be counterproductive as they can result in a lack of or poor quality of anonymized data. The anonymization can fail to preserve the format in the production data, or only partially preserve format, making it difficult to rely on the anonymized data.

For users that rely on the anonymized data, existing anonymization techniques can lead to poor data (e.g., testing data), or lack thereof, can decrease timeliness, increase development costs, increase application failure or unintended performance risk. Some existing approaches require preliminary or preceding work to gain access to the production data (or to produce adequate substitutes) that can be greater than the substantive work. In addition, the lack of or poor quality of the testing data can place unnecessary stress and difficulty among users developing applications (e.g., developers, quality engineers, performance engineers, etc.).

BRIEF DESCRIPTION OF THE DRAWINGS

Embodiments will now be described with reference to the appended drawings wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

This disclosure includes a tokenizer for anonymizing sensitive (e.g., production data), the anonymization preserving the format of the production data. The anonymized data can be relied upon by users (e.g., ETL engineers, performance engineers) including employees of the enterprise, or downstream applications, etc.

The anonymization process involves a tokenizer, which can be access-restricted in a manner similar to the production data, generating a token table that has a plurality of replacement token mappings. The token table is used to process sensitive data (e.g., a subset used to create a test sample) and map the replacement of the sensitive data with replacement tokens. The token table can include a plurality of mappings or mapping sets. For example, the mapping can replace contiguous number sequences (contiguous letter sequences) with unique randomly generated contiguous number sequences (randomly generated letter sequences), creating replacement data of the same length and same format. The token table can include mapping sets for sensitive data (e.g., credit card numbers) and mapping sets for date/time data, with all mappings preserving the format of data in the original data.

The disclosure provides an approach that can be used to generate data for use by users without access to production data in a relatively timely manner, and with a process that is relatively simple. As the tokenizer maintains format without the explicit configuration to do so, it can be used to make token tables for a plurality of datasets of different formats without pre-work (e.g., configuration, manual access permissions to generate the tables, etc.).

The tokenizer approach can be reused with token tables and resulting tokenized data being replaced periodically or on demand. The tokenizer approach is also security robust in that the tokenizer can output tokenized data to lesser permissioned environments/spaces, and access to the tokenizer can be controlled similar to production data. Access to the token tables can be limited to the tokenizer, further increasing the robustness of the system described herein.

The disclosed tokenizer approach can be scaled easily such that the size of the token table can be controlled such that it can be implemented on readily available computing resources, and generating the tokenized datasets can be performed with the benefit of a plurality of computing nodes.

In one aspect, a device for tokenizing data is disclosed. The device includes a processor, a communications module coupled to the processor, and a memory coupled to the processor. The memory stores computer executable instructions that when executed by the processor cause the processor to provide a dataset comprising a plurality of characters and provide a token table for tokenizing datasets. The token table includes mappings that define replacement tokens for characters in datasets. The instructions cause the processor to generate a tokenized dataset based on the dataset by (1) for each contiguous sequence of letter characters of the plurality of characters, determining a respective letter token having the same length as the respective contiguous sequence, and (2) generating the tokenized dataset by replacing each contiguous sequence of letter characters of the plurality of characters with the determined respective letter token.

The dataset can be one of a plurality of datasets, and at least two of the plurality of datasets can have data in different formats and the computer executable instructions cause the processor to with the token table, generate tokenized datasets for each dataset of the plurality of datasets, each tokenized dataset preserving the format of the corresponding dataset. The computer executable instructions can cause the processor to distribute the table token to a plurality of nodes and provide subsets of the plurality of datasets to the plurality of nodes to distribute generation of the tokenized datasets.

In example embodiments, the computer executable instructions cause the processor to refresh the token table, and refresh at least one tokenized dataset generated with the token table that preceded the refreshed token table.

In example embodiments, the token table and the dataset are in a first environment having a first level of access, and the computer executable instructions cause the processor to transmit the tokenized dataset to a second environment having a second level of access. The second environment does not having access to the token table or the dataset.

In example embodiments, to generate the tokenized dataset, the computer executable instructions cause the processor to identify occurrences of temporal data within the plurality of characters based on one or more preconfigured reference character sequences. the computer executable instructions cause the processor to, for each identified occurrence, replace the corresponding characters of the plurality of characters with a replacement sequence defined in the token table, the replacement sequence preserving a format of the occurrence. The token table can define replacement sequence by randomly adding one or more temporal units to the identified occurrence.

In example embodiments, to generate the tokenized dataset, the computer executable instructions cause the processor to (1) for each contiguous sequence of number characters of the plurality of characters, determine a respective number token having the same length as the respective contiguous sequence, and (2) generate the tokenized dataset by replacing each contiguous sequence of number characters of the plurality of characters with the determined respective number token. The token table can be prepopulated with a plurality of tokens for a plurality of contiguous number sequences.

In example embodiments, to generate the tokenized dataset, the computer executable instructions cause the processor to identify subsets of the dataset that contain only numbers and to determine if the identified subsets satisfy criteria for implementing additional anonymization features. The computer executable instructions cause the processor to, in response to determining the criteria are satisfied, apply one or more additional measures to the identified subsets to generate replacement tokens for the identified subsets. The computer executable instructions cause the processor to generate the tokenized dataset by replacing each identified subset with the generated replacement tokens for the identified subsets.

In example embodiments, to generate the tokenized dataset, the computer executable instructions cause the processor to identify subsets of the dataset that contain only numbers, and determine if the identified subsets satisfy criteria for implementing additional safety features. The computer executable instructions cause the processor to in response to determining the criteria are unsatisfied, divide the identified subsets into further subsets that have the same length as a maximum size number only token value, and based on the further subsets, determine the corresponding number only token in the token table. the computer executable instructions cause the processor to generate the tokenized dataset by replacing each identified subset by combining the corresponding number only tokens for each further subset.

In another aspect, a method for tokenizing data is disclosed. The method includes providing a dataset comprising a plurality of characters, and providing a token table for tokenizing datasets. The token table includes mappings that define replacement tokens for characters in datasets, and the token table includes at least three mapping constraints. The method includes generating a tokenized dataset based on the dataset and the at least three mappings (alternatively referred to as mapping constraints) by determining whether subsets of the dataset comprise one of: alphanumerical strings, only numbers, or temporal entry. The method includes, for each alphanumerical string subset, applying a first set of mappings of the token table to replace the respective subset. The method includes, for each only numbers subset, applying a second set of mappings of the token table to replace the respective subset. The method includes, for each temporal entry subset, applying a third set of mappings of the token table to replace the respective subset. The method includes generating the tokenized dataset by replacing each determined subset with the respective replacement subset.

In example embodiments, the dataset is one of a plurality of datasets, and at least two of the plurality of datasets have data in different formats, and the method includes with the token table, generating tokenized datasets for each dataset of the plurality of datasets, each tokenized dataset preserving the format of the corresponding dataset.

In example embodiments, the method further includes distributing the table token to a plurality of nodes, and providing subsets of the plurality of datasets to the plurality of nodes to distribute generation of the tokenized datasets.

In example embodiments, the method further includes refreshing the token table, and refreshing at least one tokenized dataset generated with the token table that preceded the refreshed token table.

In example embodiments, the token table and the dataset are in a first environment having a first level of access, and the method includes transmitting the tokenized dataset to a second environment having a second level of access, the second environment not having access to the token table or the dataset.

In example embodiments, the method further includes prepopulating the token table with a plurality of tokens for a plurality of contiguous number sequences to replace only numbers subsets.

In example embodiments, the first set of mappings of the token table generate tokenized subsets by replacing contiguous letter characters with contiguous letter characters having a corresponding length, the second set of mappings of the token table generate tokenized subsets by replacing contiguous number characters with randomized number tokens having a corresponding length, and the third set of mappings of the token table generate tokenized subsets by randomly incrementing or decreasing the determined temporal entry subset.

In example embodiments, the first set of mappings of the token table generate tokenized subsets by replacing contiguous number characters with the second set of mappings.

In another aspect, a non-transitory computer readable medium for tokenizing data is disclosed. The computer readable medium includes computer executable instructions for providing a dataset comprising a plurality of characters and providing a token table for tokenizing datasets. The token table includes mappings that define replacement tokens for characters in datasets. The token table includes at least three mapping constraints. The instructions are for generating a tokenized dataset based on the dataset and the at least three mappings by determining whether subsets of the dataset comprise one of: alphanumerical strings, only numbers, or temporal entry. The instructions are for, for each alphanumerical string subset, applying a first set of mappings of the token table to replace the respective subset. The instructions are for, for each only numbers subset, applying a second set of mappings of the token table to replace the respective subset. The method includes, for each temporal entry subset, applying a third set of mappings of the token table to replace the respective subset. The instructions are for generating the tokenized dataset by replacing each determined subset with the respective replacement subset.

Figure 1:
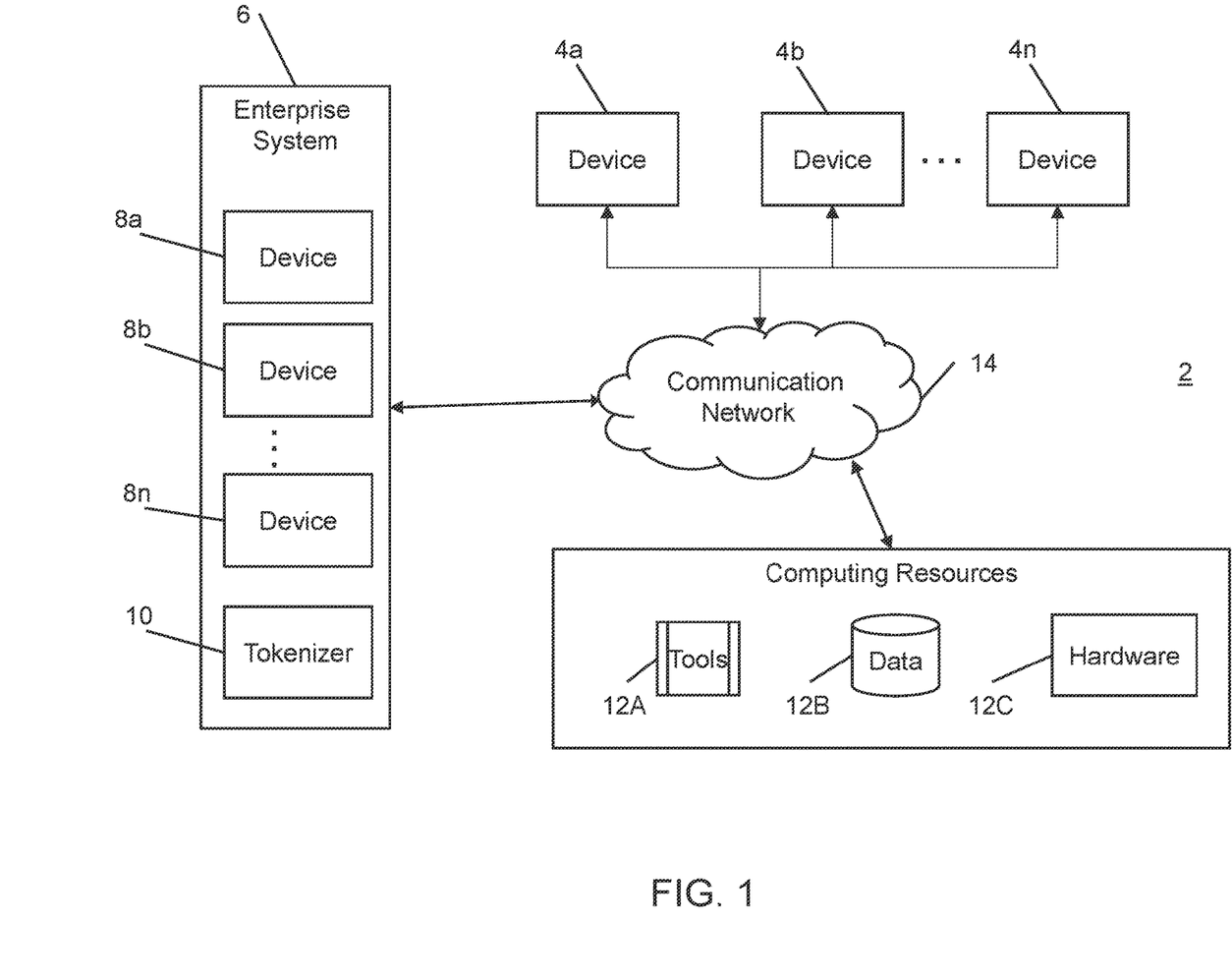
FIG. 1 is a schematic diagram of an example computing environment.

Referring now to FIG. 1, an exemplary computing environment 2 is illustrated.

In the example embodiment shown, the computing environment 2 includes one or more devices 4 (shown as devices 4a, 4b, . . . 4n), an enterprise system 6, and devices 8 (e.g., the shown devices 8a, 8b, to 8n), internal to the enterprise system 6.

The devices 4 can be external to the enterprise system 6, and can be used to access functionality of the enterprise system 6 (e.g., by an employee). Devices 4 can include, but are not limited to, one or more of a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, and any additional or alternate computing device, and may be operable to transmit and receive data across communication networks such as the communication network 14 shown by way of example in FIG. 1.

Devices 4 can be used by different users, and with different user accounts. For example, in some embodiments, a device 4a can be internal to the enterprise system 6 (not shown) and used by an employee with a first level of access, an employee with a second level of access, etc., third party contractor, customer, etc. The user may be required to be authenticated prior to accessing the device 4, the device 4 can be required to be authenticated prior to accessing either the enterprise system 6 or the remote computing resources 12 (as described herein), or any specific accounts or resources within computing environment 2.

The device 4 can access information within the enterprise system 6 or remote computing resources 12 in a variety of ways. For example, the device 4 can access the enterprise system 6 via a web-based application, or a dedicated application (e.g., application 408 of FIG. 4, or applications 520 of FIG. 5), etc. Access can require the provisioning of credentials (e.g., login credentials, two factor authentication, etc.). In example embodiments, each different device 4 can be provided with a degree of access, or variations thereof. For example, the internal device 8 (as described herein) can be provided with a greater degree of access to the enterprise system 6 as compared to the external device 4.

The devices 8, internal to the enterprise system 6, can be used to implement the functionality of the enterprise system 6. For example, the device 8a can be a server for accessing a first environment/space having production data, the device 8b can be another device for accessing a second environment/space having anonymized data, etc.

Similar to devices 4, the devices 8 can be realized via one or more of (but are not limited to) legacy hardware such as a mainframe, a server, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, and any additional or alternate computing device, and may be operable to transmit and receive data across communication networks such as the communication network 14 shown by way of example in FIG. 1. In example embodiments, some aspects of device 8 can be realized virtually. That is, a first hardware configuration (e.g., a mainframe) can be used to generate virtual machines that mimic the functionality of having separate hardware resources to instantiate a separate device 8.

The devices 8 can include one or more servers or databases (not shown) that store at least some sensitive data. The sensitive data can include, for example, and without limitation, data managed by a financial institution (e.g., customer data, employee data, credit card information, banking information, tax information, etc.). The sensitive data can be sensitive because its disclosure can impact a customer or party to whom the data belongs (e.g., a partner of the enterprise), or the data can be sensitive as a result of its importance to the enterprise, or the data can be sensitive owing to consequences of its disclosure (e.g., regulatory or legal obligations), etc.

The enterprise system 6 includes a tokenizer 10. The tokenizer 10 can be a standalone functionality or application, or it can be provided as part of another functionality. In example embodiments the tokenizer 10 is provided by a third party and accessed by the enterprise system 6. The tokenizer 10, as will be discussed in greater detail below, can generate token tables and tokenized datasets. The tokenized datasets can be used in environment(s)/stage(s) that do not have access to sensitive data. For example, a testing engineer can use the tokenized dataset to determine application performance.

In example embodiments, some of the functionality of the enterprise system 6, or devices 4, 8, is implemented by remote computing resources 12. The remote computing resources 12 (hereinafter referred to simply as computing resources 12) includes resources which are stored or managed by a party other than operator of the enterprise system 6 and are used by, or available to, the enterprise system 6. For example, the computing resources 12 can include cloud-based storage services (e.g., database(s) 12B). In at least some example embodiments, the computing resources 12 include one or more tools 12A developed or hosted by the external party (e.g., which can include the tokenizer 10, in certain implementations), or tools for interacting with the computing resources 12, etc. The computing resources 12 can also include hardware resources (e.g., the shown hardware 12C), such as access to processing capability of server devices (e.g., cloud computing), and so forth.

Components of the environment 2 can be connected by a communications network 14 to one or more other components of the computing environment 2. In at least some example embodiments, all the components shown in FIG. 1 are within the enterprise system 6, and the communication network 14 is an enterprise-maintained network.

Communication network 14 may include a telephone network, cellular, and/or data communication network to connect distinct types of client devices. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet). The communication network 14 may not be required to provide connectivity within the enterprise system 6 or the computing resources 12, or between devices 4, wherein an internal or other shared network provides the necessary communications infrastructure.

The computing environment 2 can also include a cryptographic server or module (e.g., encryption module 512 of FIG. 5) for performing cryptographic operations and providing cryptographic services (e.g., authentication (via digital signatures), data protection (via encryption), etc.) to provide a secure interaction channel and interaction session, etc. The cryptographic module can be implemented within the enterprise system 6, or the computing resources 12, or external to the aforementioned systems, or some combination thereof. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications carried out by the enterprise system 6 or device 4. The cryptographic server may be used to protect data within the computing environment 2 (e.g., including data stored in database(s) 12B) by way of encryption for data protection, digital signatures or message digests for data integrity, and by using digital certificates to authenticate the identity of the users and entity devices with which the enterprise system 6, computing resources 12, or the device 4 communicates, to inhibit data breaches by adversaries. It can be appreciated that various cryptographic mechanisms and protocols can be chosen and implemented to suit the constraints and requirements of the computing environment 2, as is known in the art.

The enterprise system 6 can be understood to encompass the whole of the enterprise, a subset of a wider enterprise system (not shown), such as a system serving a subsidiary or a system for a particular branch or team of the enterprise (e.g., a resource migration division of the enterprise). In at least one example embodiment, the enterprise system 6 is a financial institution system (e.g., a commercial bank) that provides financial services accounts to users and processes financial transactions associated with those financial service accounts. Such a financial institution system may provide its customers with various browser-based and mobile applications, e.g., for mobile banking, mobile investing, mortgage management, etc. Financial institutions can be responsible for vast amounts of data and have vast amounts of existing records. To provide applications based on that data, effective anonymization schemes are required.

Figure 2A:
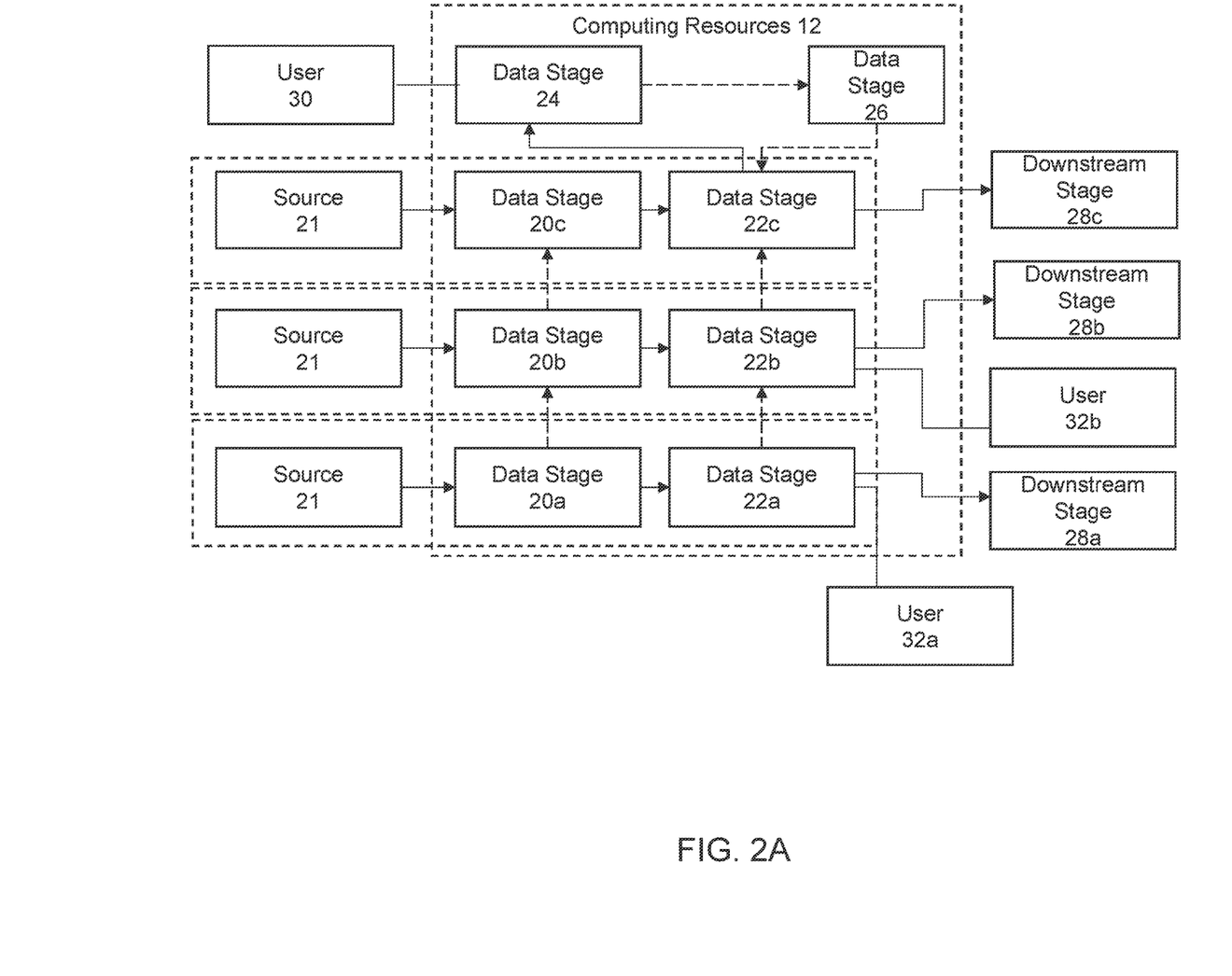
FIG. 2A is a diagram illustrating data moving through an existing framework for managing data within an enterprise.

Referring now to FIG. 2A, a diagram illustrating data moving through an existing framework for managing data within an enterprise is shown. In the shown framework, three different levels of access are depicted.

A first level of access is given to production data, which is sensitive data. The production data can originate in a source 4d and be provided to a first data stage 20c of the computing resources 12 and that data can be provided to a second stage 22c. For example, data stage 20c can maintain current production data, whereas data stage 22c can maintain historical production data. In an example embodiment, data in stage 20c can be processed according to one or more ingestion parameters and stored in another format in a data stage 22c. In example embodiments, data stages 20c and 22c can denote a data in the same format, but stored in different stages, or data stored in different formats. The first environment having a first level of access is shown with a horizontally elongated dotted box; it is understood that each of the stages/sources shown can be individually permissioned with a level of access, and that the access provided to these individual stages can overlap so as to be considered to "first" level.

A second level of access is given to a second environment/stage(s). Data in this environment can be metadata derived from production data (e.g., test results of tests run on subsets of production data), data available for testing of performance, or more generally data which, while potentially less sensitive, can require protection. For example, data stage 20b can maintain current product testing data, whereas data stage 22b can maintain historical product testing data. Similar to data stages 20c, 22c, data in stage 20b can be processed according to one or more parameters and stored in another format in a data stage 22b. In example embodiments, data stages 20b and 22b can denote data in the same format but stored in different stages. The second environment having a second level of access is shown with a horizontally elongated dotted box; it is understood that each of the stages/sources shown can be individually permissioned with a level of access, and that the access provided to these individual stages can overlap so as to be considered to "second" level.

A third level of access is given to a third environment (shown by the horizontally elongated dotted box containing the data stages 20a, 22a, and the data source 21). Data in this environment can be data used for development of applications that impact the production data (e.g., a development environment to generate new applications, etc.). The data is this environment, while potentially less sensitive, can require protection. For example, data stage 20a can maintain current production data, whereas data stage 22a can maintain historical production data. In an example embodiment, data in stage 20a can be processed according to one or more parameters and stored in another format in a data stage 22a. In example embodiments, data stages 20a and 22a can denote a data in the same format, but stored in different stages, or data stored in different formats. The third environment having a third level of access is shown with a horizontally elongated dotted box; it is understood that each of the stages/sources shown can be individually permissioned with a level of access, and that the access provided to these individual stages can overlap so as to be considered to "third" level.

The data in each of the above described illustrative environments can be further provided to a downstream stage, shown respectively by the downstream stages 28a, 28b, 28c. Data in these downstream stages can be used by applications, etc. In FIG. 2A, data flows are shown with full lines, whereas code promotion is shown via dotted lines.

In this shown existing system, a user 30 can have access to the production data in the first environment via a data stage 24. The user 30 can be a business analyst that is able to input queries on the production data in the first environment, wherein the query is shown via the dotted connection to the data stage 26, which data stage 26 can interact with the data stage 22c to fulfil the query and provide the requested data to the data stage 24.

Unlike user 30, users 32a, 32b, may have permission to access other environments or data, but do not have permission to access production data and/or the environment that the production data is stored in. These users experience issues in performing tasks without access to the production data. User 32a can be an extract, transform, load (ETL) developer, or a quality control engineer, whose ability to determine quality is impacted by a thorough knowledge of the production data. For example, the ETL engineer can require test data, and effective testing can require the testing data be in the same format as the production data. The testing data may also be required to maintain referential integrity. User 32b can be a performance engineer, whose ability to test applications can be impacted by thorough knowledge of data coming into the resources 12 including production data. The performance engineer can need production data within a relatively short timeframe (e.g., for a few days of a month).

Figure 2B:
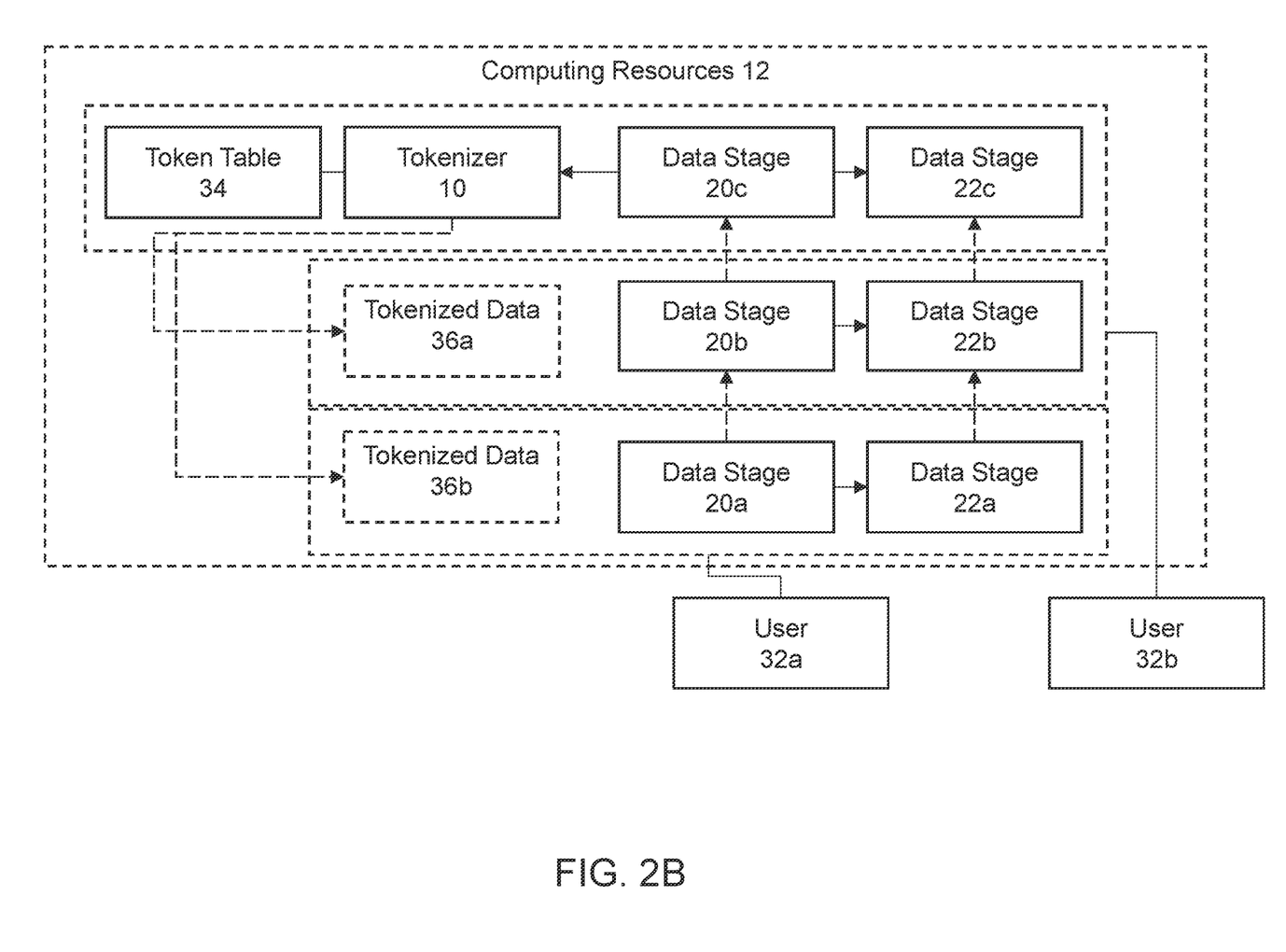
FIG. 2B is a diagram illustrating an example framework for anonymizing data.

FIG. 2B is a diagram illustrating an example framework for anonymizing data.

In FIG. 2B, the tokenizer 10 is provided in the first environment and accesses the data in that environment to generate one or more token tables 36. The token tables 34 store mappings between input character sequences and tokens. The token tables 34 can be used to process data (e.g., production data) in stages 20c, 22c, having one or more character sequences therein. Multiple sequences can be present in the data in the aforementioned stages, such as data including customer account numbers, names, addresses, postal codes, etc., where each sequence (e.g., a row entry) is a set of contiguous characters. This data can be stored in delta tables (stages 20c, 22c). Example embodiments of the one or more mappings are discussed in greater detail below.

In example embodiments, a set of mappings of the token tables include mappings based on detecting a date and/or time set of characters in the input sequence. For example, the token tables can be prepopulated to respond with replacement tokens in response to any one of a plurality of date/time formats, such as yyyy-mm-dd, dd/mm/yyyy, yyyDDD, etc. Referred to hereinafter as temporal mappings, these mappings can apply in response to data from the stage(s) (e.g., stages 20c, 22c) being parsed and the presence of the aforementioned formats being determined in the parsed data. The temporal mappings can specify concrete approaches to altering the date/time data, such as adjusting the production date/time data (e.g., based on know changes given the detected format) by a fixed or random amount. The adjustments maintain the format of the production date/time data as no characters are added.

The set of mappings of the token tables can include mappings based on detecting Boolean value character sequences. In at least some example embodiments, the Boolean values are preserved (i.e., remain unchanged), or are randomly changed, etc.

The set of mappings of the token tables can include mappings based on detecting special character occurrences or sequences. In at least some example embodiments, the special character values are preserved (i.e., remain unchanged), or are randomly changed, etc.

In example embodiments, a set of mappings of the token tables include mappings based on detecting letter only characters in input sequences. Production data can be organized in subsets (e.g., a row entry in a tabular dataset), and in at least some example embodiments entries can be sorted individually to determine the if only letter characters are present in the entry. For example, name entries can contain only letter characters. Various lettering systems are contemplated, including lettering systems based on Latin letter, Chinese characters, etc.

The letter only mappings can define replacement tokens for different contiguous sequences of letter only characters. For example, referring to FIG. 2C, table 40 shows an example having three different letter only sequences, and the replacement tokens being randomly generated or pre-populated contiguous letter tokens of the same length as the input sequence. Importantly, the format of the original value is maintained in the token value. In example embodiments, all, some, or none of the letter only mappings are pre-populated. In at least some example embodiments, letter only mappings are generated in response to encountering new contiguous sequences of letter only characters. For example, a new token can be randomly generated according to known techniques in response to encountering a new contiguous sequence of letter only characters. As the total words in, for example, the English language is below 200,000, generating unique tokens for continuous sequences is not too intensive. Token length of replacement tokens determined based on the letters only mappings is the same as the original value.

Figure 2C:
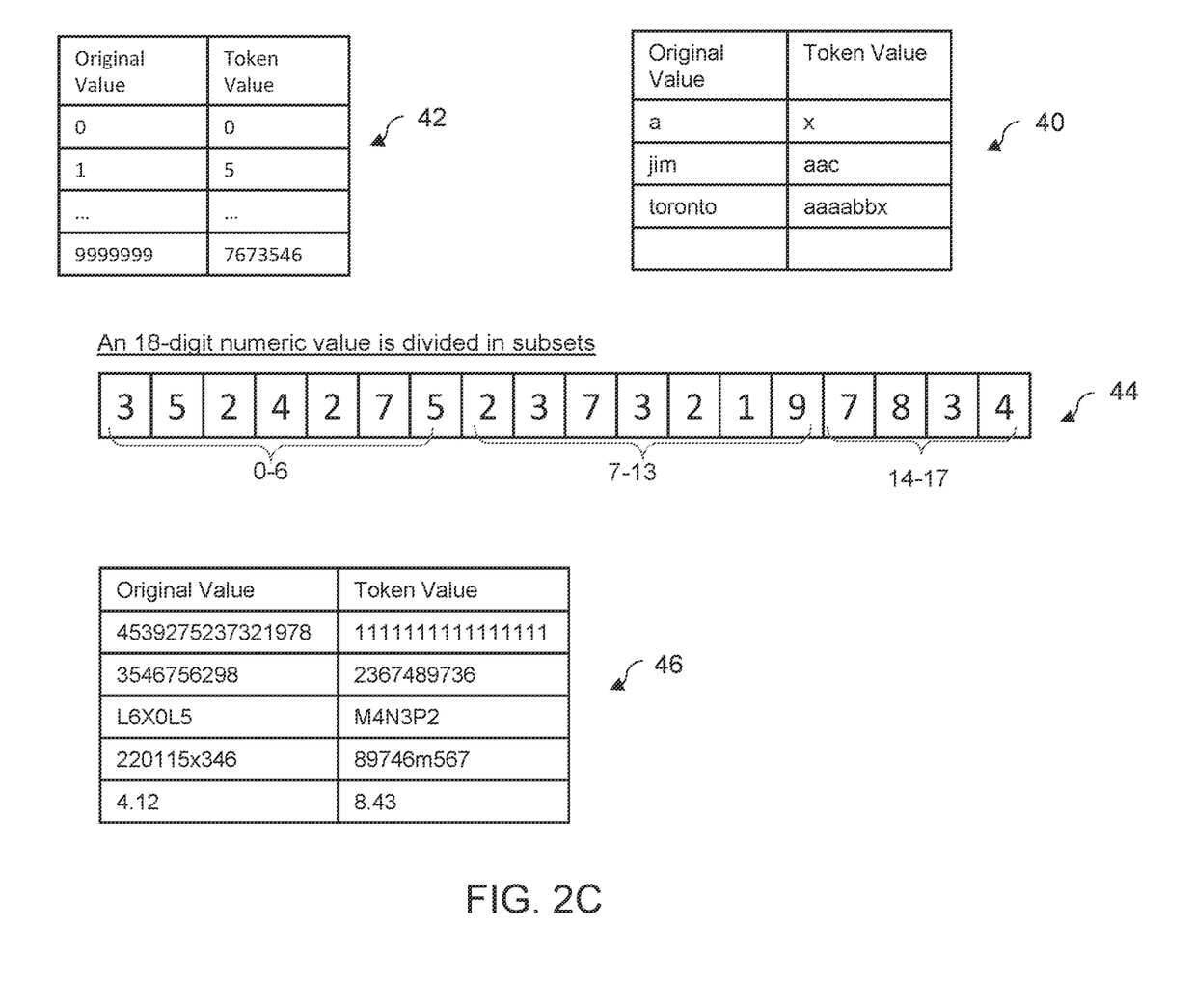
FIG. 2C is a diagram illustrating example data anonymization.

In example embodiments, a set of mappings of the token tables include mappings based on detecting number only characters in input sequences. The number only mappings can include two different categories: a first category for numbers which satisfy certain sensitivity criteria, and a second category for numbers that do not satisfy the aforementioned criteria. The sensitivity criteria can be based on an expected format for sensitive numbers requiring additional measures, such as additional masking. For example, the criteria can be pre-configured to enable detection of sensitive numbers such as credit card numbers, social security numbers, etc., based on a length of the detected numbers only sequence. Continuing the example, any numbers only sequence in the production data having an exact length of 15 or 16 digits can be determined to satisfy the criteria.

The mappings for numbers only sequences in the first category can have additional operations performed to enhance privacy. For example, the numbers can be converted to Luhn's check numbers. The additional features can ensure that the original numbers of the sequence are anonymized to prevent reverse engineering.

The mappings for the second category of numbers only sequences can apply relatively simpler anonymization. For example, the numbers only sequences in the second category can be replaced with tokens based on mappings of unique contiguous sequences to same length randomly generated number tokens (e.g., see table 42 of FIG. 2C). The randomly generated number tokens can be generated by, for example, pyCrypto shuffling.

In example embodiments, to manage computational load, number only sequences in the second category can be partitioned to subsequences for tokenization. For example, the further subset size of each numbers only sequence can be based on the feasibility of implementation on standardly available equipment, such as a laptop, and can be. For example, the maximum number only sequence can be set to seven (7) characters, as shown in sequence 46 of FIG. 2C, ensuring that the token table is not too large. Portioning number only sequences into subsets can still result in almost complete, if not complete, replacement of original data with unique tokens. The replacement tokens, as a result of being randomly generated numbers having the same length as the original values, maintains the format of the production data.

The set of mappings of the token tables can include mappings based on detecting alphanumeric strings comprising letter and number characters in the input sequences. The alphanumeric mappings can include two different categories: a first category for alphanumeric strings which satisfy low cardinality criteria, and a second category for numbers that do not satisfy the aforementioned criteria. The cardinality criteria can be based on timeliness and masking performance considerations. For example, the cardinality criteria can be pre-configured to enable detection of sequences that have a low cardinality (e.g., less than 10) which may inadvertently disclose the token mapping through repetition. Therefore, the first category of alphanumeric mappings, where low cardinality is detected, can generate a new random value across rows.

The second category of mapping can include replacing values of production data based on contiguous sequences of numbers or letters. For example, each contiguous sequence of numbers can be replaced based on the numbers only mapping described above. Similarly, each contiguous sequence of letters can be replaced based on the letters only mapping described above. An example of the replacement tokens is shown in table 46 of FIG. 3C. As with other discussed mappings herein, and importantly, the format of the production data is preserved without any explicit configuration to do so. For example, in instances where a plurality of production data having different formats is being used to generated tokenized databases, the tokenizer 10 or token table is not required to be configured for each database; its operation preserves the format of the plurality of databases.

The token table 34 can include at least one of the above mappings, and apply a variety of combinations of the above described mappings. For example, the token table 34 can include the number and letter only mappings, while applying no tokenization of special characters. In another example, the token table 34 can include the alphanumeric mappings, but without the additional criteria based distinction.

The token tables 34 generated by the tokenizer 10 can be generated by the tokenizer 10 at first instance, periodically updated, updated according to a prompt, etc. In response to a token table 34 being refreshed, tokenized datasets 36 generated on the basis of the token table 34 can similarly be refreshed. The token table 34 can be stored in an encrypted table accessible only to the tokenizer 10, further reducing the risk of data underlying the tokenized data being unintentionally accessed.

The tokenizer 10 can be configured to generate various sized tokenized datasets 36. For example, the tokenizer 10 can be configured to generate sample data sets based on a subset of the production data, to generate tokenized datasets 36 within a particular time, etc. With the approaches described herein, the tokenizer 10 can maintain referential integrity in the table entries that it replaces.

The tokenizer 10 can be permitted to transmit or generate the tokenized datasets 36 in various environments that do not have access to the production data. For example, in FIG. 2B, tokenized datasets 36a and 36b are generated in various environments for access by users 32.

The tokenized datasets 36 can exist independently or can at least in part replace data in certain of the data stages 20, 22. In example embodiments, users 32 can configure whether the tokenized dataset 36 is used to overwrite certain data in environments/stages they are responsible for.

In at least some example embodiments, the token table 34 is provided to a plurality of nodes (e.g., different servers of the computing resources 12) of the computing resources 12, and the process of generating tokenized datasets 36 is distributed among the nodes (e.g., via a Spark job).

Figure 3A:
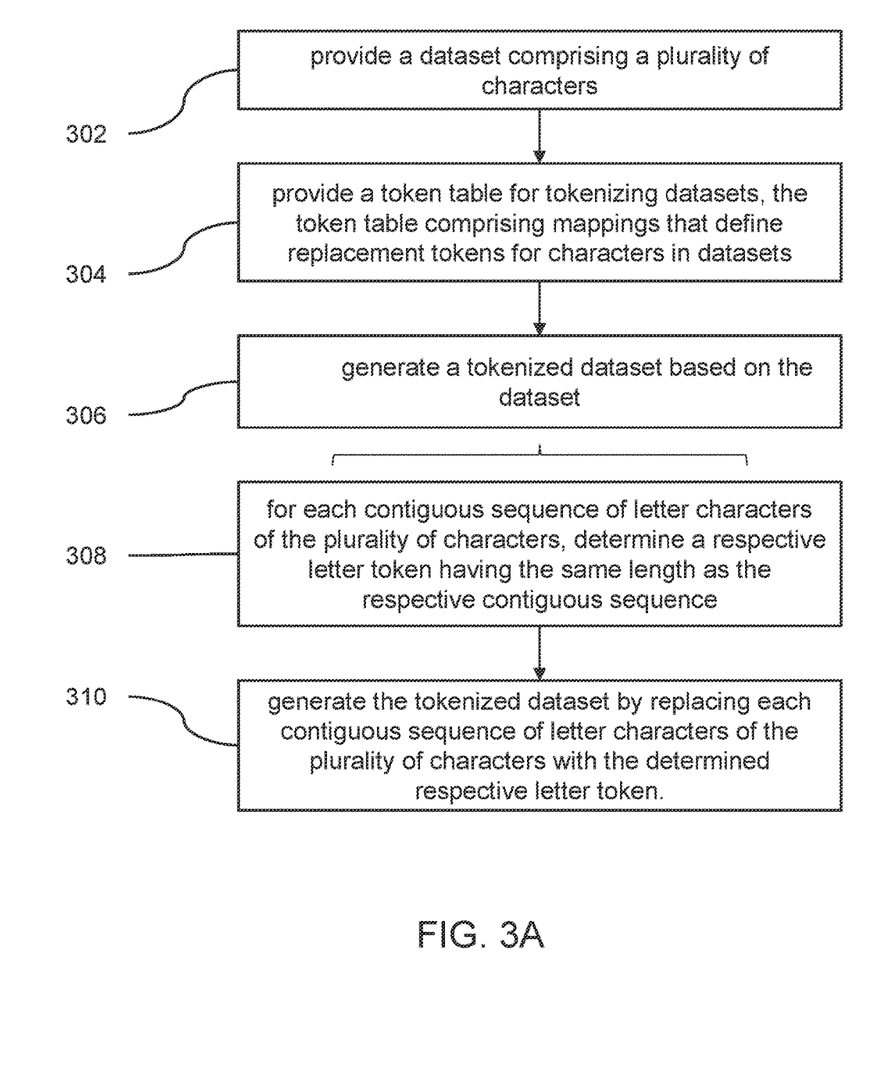
FIG. 3A, 3B are each a flow diagram of an example embodiment of computer executable instructions for implementing a method for anonymizing data.
Figure 3B:
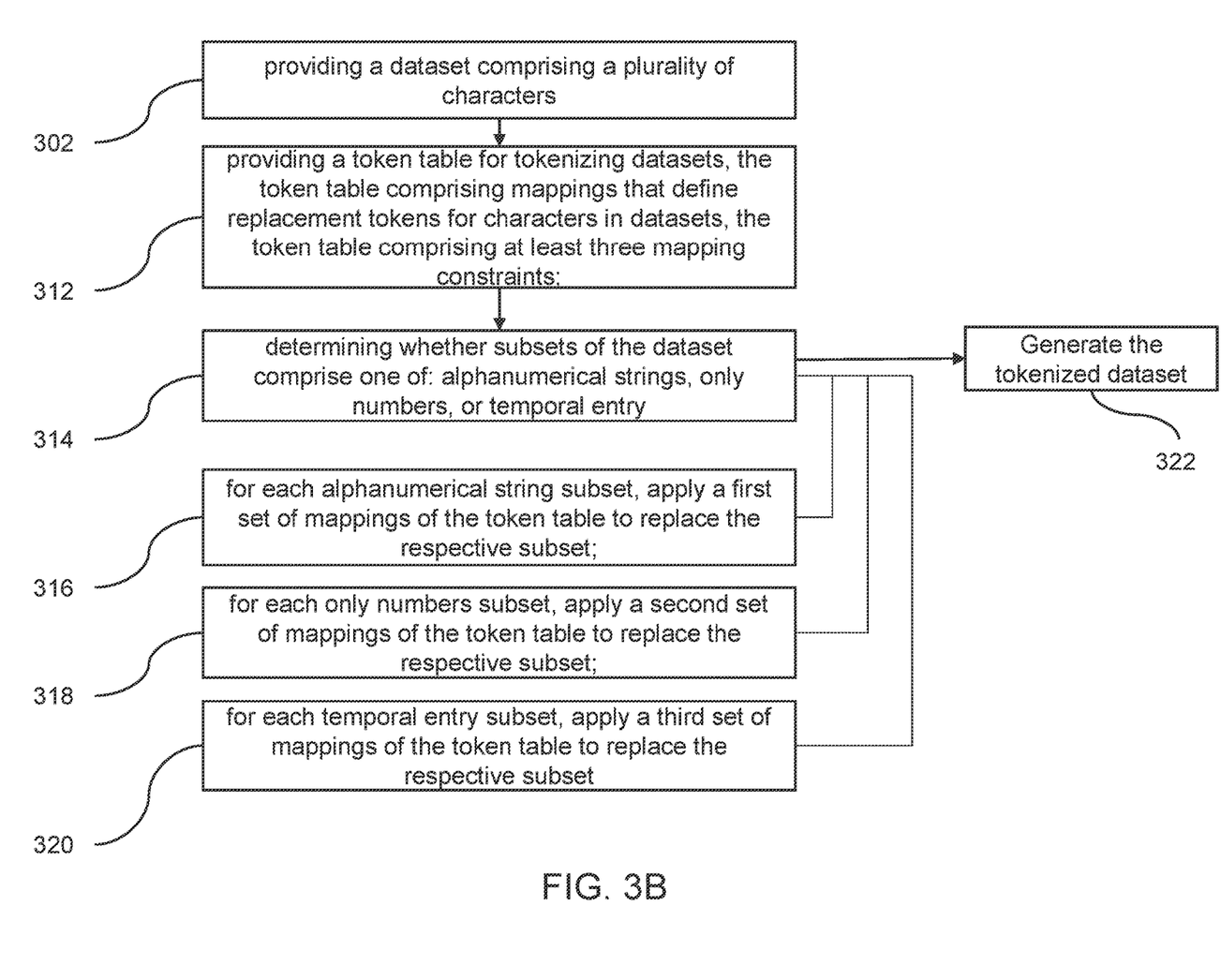

FIGS. 3A, 3B are each a flow diagram of an example embodiment of computer executable instructions for implementing a method for anonymizing data. For illustration, reference will be made to the preceding figures. It is understood that the references to the preceding figures are not intended limit the disclosed method to the embodiments described therein.

Referring to FIG. 3A, at block 302, a dataset comprising a plurality of characters is provided. The dataset can be a dataset in stage 20c. The dataset can include various subsets of the plurality of characters (e.g., an entry), with each subset being demarked and therefore capable of being processed.

At block 304, a token table 34 is provided. The token table 34 can be generated by the tokenizer 10, or the provided token table 34 can be a refreshed token table. The token table 34 includes mappings that define replacement tokens for characters in datasets.

At block 306, a tokenized dataset (e.g., dataset 36) is generated from the dataset provided in block 302. Blocks 308 and 310 describe operations to generate the tokenized dataset. In block 308, for each contiguous sequence of letter characters of the plurality of characters of the dataset of block 302, a respective letter token having the same length as the respective contiguous sequence is determined. At block 310, the determined letter tokens are used to replace the respective contiguous sequences in the dataset to generate the tokenized dataset.

Referring to FIG. 3B, at block 302, a dataset comprising a plurality of characters is provided. The dataset can be a dataset in stage 20c. The dataset can include various subsets of the plurality of characters (e.g., an entry), with each subset being demarked and therefore capable of being processed.

At block 312, a token table 34 is provided. The token table includes mappings that define at least three mapping constraints (e.g., sets of mappings). It is understood that while a specific combination of mapping sets is described below, in example embodiments, the at least three mappings can include combinations of the mappings described herein (e.g., letters only mappings, numbers only mappings, and special character mappings).

At block 314, a determination is made as to whether subsets of the dataset (e.g., row entries) comprise one of alphanumeric strings, only numbers, or temporal entries.

As shown in block 316, alphanumeric strings have a first set of mappings applied to replace the alphanumeric string subsets.

As shown in block 318, numbers only sequences have a second set of mappings applied to replace the numbers only sequences.

As shown in block 320, temporal entries have a third set of mappings applied to replace the temporal entries.

At block 322, a tokenized dataset is generated based on the replacement tokens of blocks 316, 318, and 320.

It is understood that variations of the sequences shown in FIGS. 3A, 3B are contemplated by this disclosure. For example, blocks 316, 318, and 320 can be completed in parallel, in sequence, or a sequence other than the sequence implied by the consecutive numbering. Similarly, the token table of block 304 can be provided prior to receiving the dataset that is tokenized in block 302.

Figure 4:
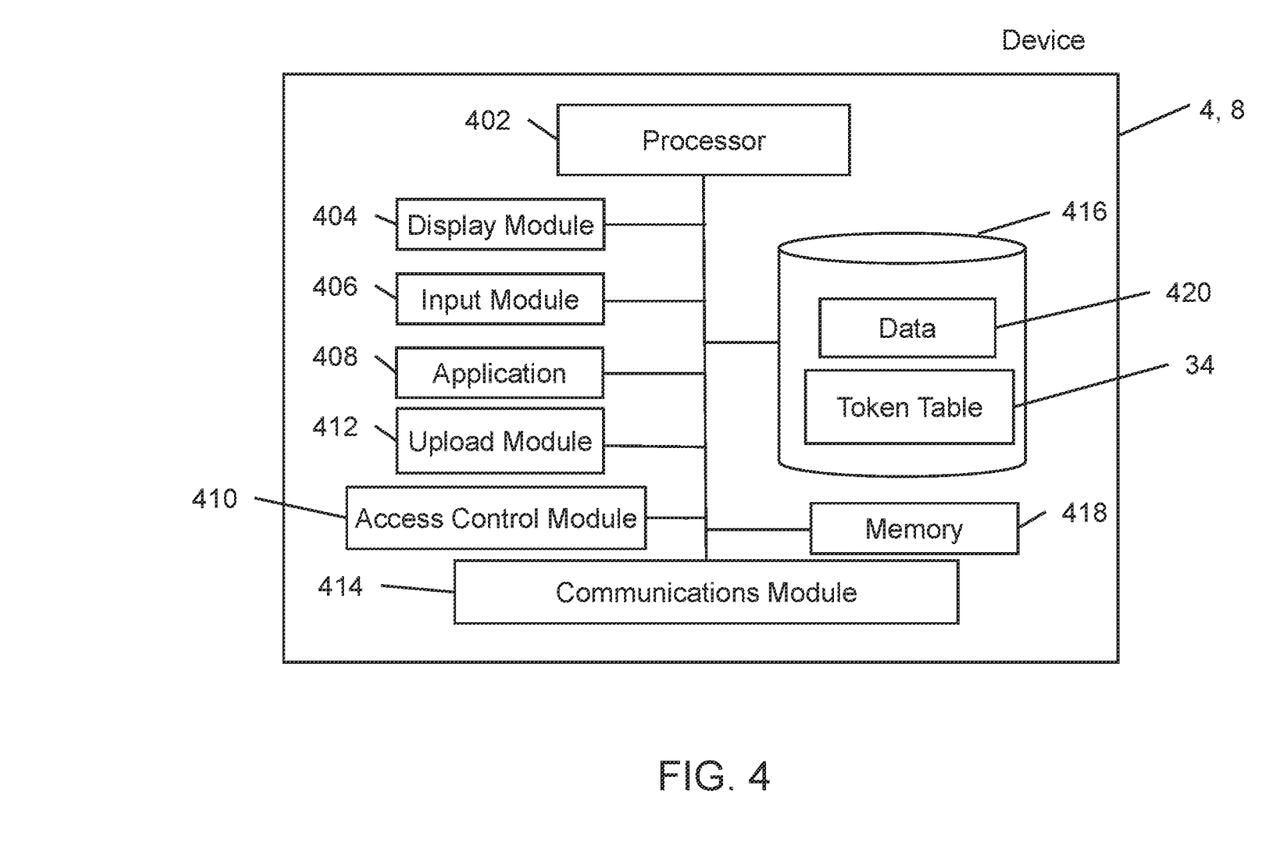
FIG. 4 is a block diagram of an example configuration of an example device.

Referring now to FIG. 4, an example configuration of a device 4, 8 (hereinafter referred to solely as device 4, for ease of reference) is shown. It can be appreciated that the device 4 shown in FIG. 4 can correspond to an actual device or represent a simulation (e.g., a virtual machine) of such a device 4. The shown device 4 can be an internal device, or an external device. The device 4 can include one or more processors 402, a communications module 414, and a data store 416 (e.g., including data for anonymization, such as data 420, or token table(s) 34 for distributed computing).

The data store 416 can also be used to store data, such as, but not limited to, an IP address or a MAC address that uniquely identifies device 4. The data store 416 may also be used to store data ancillary to transmitting data to the computing environment 2, such as, but not limited to, login credentials, user preferences, cryptographic data (e.g., cryptographic keys), etc.

Communications module 414 enables the device 4 to communicate with one or more other components of the computing environment 2 via a bus or other communication network, such as the communication network 14. The device 4 includes at least one memory 418 or memory device that can include a tangible and non-transitory computer-readable medium having stored therein computer programs, sets of instructions, code, or data to be executed by processor 402. FIG. 4 separately illustrates examples of modules and applications stored in memory 418 on the device 4 and operated by the processor 402. It can be appreciated that any of the modules and applications shown in FIG. 4 may also be hosted externally and be available to the device 4, e.g., via the communications module 414.

In the example embodiment shown in FIG. 4, the device 4 includes a display module 404 for rendering graphical user interfaces (GUIs) and other visual outputs on a display device such as a display screen, and an input module 406 for processing user or other inputs received at the device 4, e.g., via a touchscreen, input button, transceiver, microphone, keyboard, etc. The device 4 may also include one or more applications (shown as the singular application 408) that depend on, or otherwise use tokenized data. For example, the application 408 can be an application of the enterprise system 6 that uses other than production data to complete operations. The application 408 can be a web-based application that serves certain data to contractors.

The device 4 may include an access control module 410 to control access to the data store 416, or data within the data store 416. For example, the access control module 410 can control access to the different environments or data described herein based on the registered or authenticated users of the device 4 (e.g., which users have the ability to read, access, or write with data within the data store 416). In another example, the access control module 410 can be used to control transmission of data within the data store 416, such that data can only be transmitted to pre-approved environments (e.g., token tables 34 cannot be transmitted).

The uploading module 412 enables the device 4 to, if necessary, interface with the remote computing resources 12, or a subset thereof, to transmit data or requests, etc.

Figure 5:
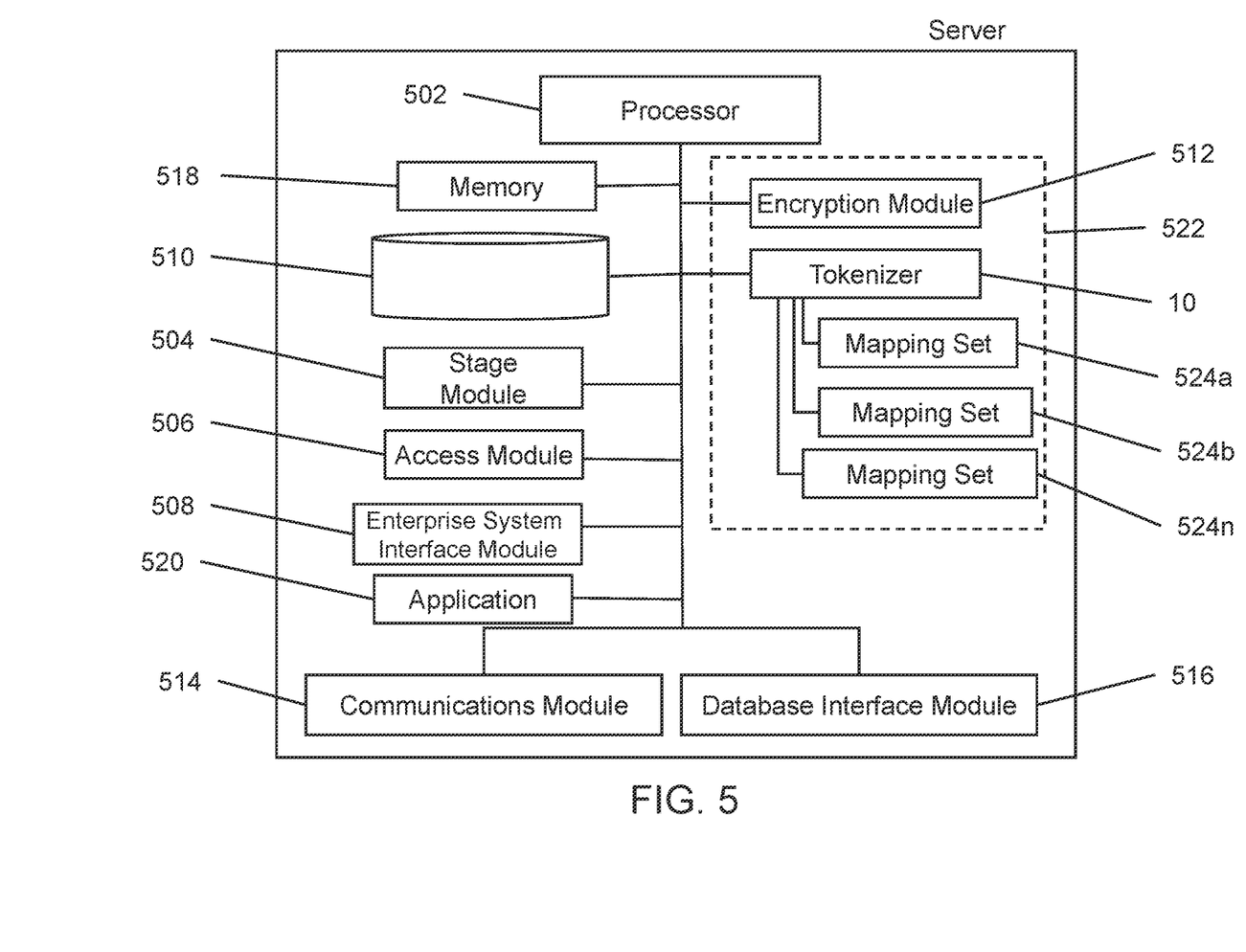
FIG. 5 is a block diagram of an example server.

Referring to FIG. 5, an example configuration of server (e.g., a server device 8 of the enterprise system, or a server device of computing resources 12), is shown. It can be appreciated that the server shown in FIG. 5 can correspond to an actual device, or represent a simulation of the functionality of a server, or represent a configuration of multiple servers cooperating as a mainframe, etc. The server can include one or more processors 502, a communications module 514, and a data store 510 (e.g., for storing the modules, access controls, maintaining stages, etc.), and a database interface module 516.

Communications module 514 enables the server to communicate with one or more other components of the remote computing resources 12 or the enterprise system 6 via a bus or other communication network, such as the communication network 14. The server includes at least one memory 518 or memory device that can include a tangible and non-transitory computer-readable medium having stored therein computer programs, sets of instructions, code, or data to be executed by processor 502. FIG. 5 separately illustrates examples of modules and applications stored in memory 518 on the server and operated by the processor 502. It can be appreciated that any of the modules and applications shown in FIG. 5 may also be hosted externally and be available to the server, e.g., via the communications module 514.

In the example embodiment shown in FIG. 5, the server includes a stage module 504 for maintaining zones (e.g., data stage 20c). The stage module 504 can allocate storage or computing resources 12 to implement the data stages, or processes to move data between stages.

The server can include an access control module 506, similar to the access control module 410. The access control module 506 can control access to modules, stages, etc., and control which users are able to initiate operation of the tokenizer 10, or to how token tables 34 are distributed, etc.

The server may also include an enterprise system interface module 508 whose purpose is to facilitate communication with the enterprise system 6.

The server can include a utility store 522 to provide functionality described herein. In the shown embodiment, a separate encryption module 512 is shown to encrypt data (e.g., to apply the additional operations to sensitive data), or to encrypt communications between environments, etc. The encryption module 512 can encrypt data in a variety of manners. In at least some example embodiments, data is encrypted by the encryption module 512 in cooperation with a complementary encryption module on the device 4 or on-premises (not shown).

The utility store 522 can include the tokenizer 10, which can include a plurality of mappings (e.g., the shown mapping sets 524a, 524b to 524n) which the tokenizer 10 can be configured to implement to generate tokenized datasets.

The database interface module 516 facilitates communication with databases used to store the data (e.g., data store 510). For example, the database interface module 516 can be used to move data between stages of the computing resources 12. The data store 510 may also be used to store data ancillary to transmitting or receiving data within the computing environment 2, such as, but not limited to, login credentials, user preferences, cryptographic data (e.g., cryptographic keys), etc.

The server can also include a plurality of applications to implement with production data and/or tokenized data, shown illustratively as the single application 520.

It will be appreciated that only certain modules, applications, tools, and engines are shown in FIGS. 2, 4, and 5 for ease of illustration and various other components would be provided and utilized by the device 4, enterprise system 6, and/or the remote computing resources 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the computing environment 2, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for tokenizing data, the device comprising:
   a processor;
   a communications module coupled to the processor; and
   a memory coupled to the processor, the memory storing computer executable instructions that when executed by the processor cause the processor to:
      provide a dataset comprising a plurality of characters;
      provide a token table for tokenizing datasets, the token table comprising mappings that define replacement tokens for characters in datasets; and
      generate a tokenized dataset based on the dataset by:
         for each contiguous sequence of letter characters of the plurality of characters, determine a respective letter token having the same length as the respective contiguous sequence; and
         generate the tokenized dataset by replacing each contiguous sequence of letter characters of the plurality of characters with the determined respective letter token.

2. The device of claim 1, wherein the dataset is one of a plurality of datasets, and at least two of the plurality of datasets have data in different formats and the computer executable instructions cause the processor to:
   with the token table, generate tokenized datasets for each dataset of the plurality of datasets, each tokenized dataset preserving the format of the corresponding dataset.

3. The device of claim 2, wherein the computer executable instructions cause the processor to:
   distribute the table token to a plurality of nodes; and
   provide subsets of the plurality of datasets to the plurality of nodes to distribute generation of the tokenized datasets.

4. The device of claim 1, wherein the computer executable instructions cause the processor to:
   refresh the token table; and
   refresh at least one tokenized dataset generated with the token table that preceded the refreshed token table.

5. The device of claim 1, wherein the token table and the dataset are in a first environment having a first level of access, and where the computer executable instructions cause the processor to:
   transmit the tokenized dataset to a second environment having a second level of access, the second environment not having access to the token table or the dataset.

6. The device of claim 1, wherein, to generate the tokenized dataset, the computer executable instructions cause the processor to:
   identify occurrences of temporal data within the plurality of characters based on one or more preconfigured reference character sequences; and
   for each identified occurrence, replace the corresponding characters of the plurality of characters with a replacement sequence defined in the token table, the replacement sequence preserving a format of the occurrence.

7. The device of claim 6, wherein the token table defines replacement sequence by randomly adding one or more temporal units to the identified occurrence.

8. The device of claim 1, wherein, to generate the tokenized dataset, the computer executable instructions cause the processor to:
   for each contiguous sequence of number characters of the plurality of characters, determine a respective number token having the same length as the respective contiguous sequence; and
   generate the tokenized dataset by replacing each contiguous sequence of number characters of the plurality of characters with the determined respective number token.

9. The device of claim 8, wherein the token table is prepopulated with a plurality of tokens for a plurality of contiguous number sequences.

10. The device of claim 1, wherein, to generate the tokenized dataset, the computer executable instructions cause the processor to:
    identify subsets of the dataset that contain only numbers;
    determine if the identified subsets satisfy criteria for implementing additional anonymization features;
    in response to determining the criteria are satisfied, apply one or more additional measures to the identified subsets to generate replacement tokens for the identified subsets; and
    generate the tokenized dataset by replacing each identified subset with the generated replacement tokens for the identified subsets.

11. The device of claim 1, wherein, to generate the tokenized dataset, the computer executable instructions cause the processor to:
    identify subsets of the dataset that contain only numbers;
    determine if the identified subsets satisfy criteria for implementing additional safety features;
    in response to determining the criteria are unsatisfied, divide the identified subsets into further subsets that have the same length as a maximum size number only token value;
    based on the further subsets, determine the corresponding number only token in the token table; and generate the tokenized dataset by replacing each identified subset by combining the corresponding number only tokens for each further subset.

12. A method for tokenizing data, the method comprising:
providing a dataset comprising a plurality of characters;
providing a token table for tokenizing datasets, the token table comprising mappings that define replacement tokens for characters in datasets, the token table comprising at least three mapping constraints; and
generating a tokenized dataset based on the dataset and the at least three mapping constraints by:
  determining whether subsets of the dataset comprise one of: alphanumerical strings, only numbers, or temporal entry;
  for each alphanumerical string subset, applying a first set of mapping constraints of the token table to replace the respective subset;
  for each only numbers subset, applying a second set of mapping constraints of the token table to replace the respective subset;
  for each temporal entry subset, applying a third set of mapping constraints of the token table to replace the respective subset; and
  generating the tokenized dataset by replacing each determined subset with the respective replacement subset.

13. The method of claim 12, wherein the dataset is one of a plurality of datasets, and at least two of the plurality of datasets have data in different formats, the method comprising:
with the token table, generating tokenized datasets for each dataset of the plurality of datasets, each tokenized dataset preserving the format of the corresponding dataset.

14. The method of claim 13, further comprising:
distributing the table token to a plurality of nodes; and
providing subsets of the plurality of datasets to the plurality of nodes to distribute generation of the tokenized datasets.

15. The method of claim 12, further comprising:
refreshing the token table; and
refreshing at least one tokenized dataset generated with the token table that preceded the refreshed token table.

16. The method of claim 12, wherein the token table and the dataset are in a first environment having a first level of access, the method comprising:
transmitting the tokenized dataset to a second environment having a second level of access, the second environment not having access to the token table or the dataset.

17. The method of claim 12, further comprising:
prepopulating the token table with a plurality of tokens for a plurality of contiguous number sequences to replace only numbers subsets.

18. The method of claim 12, wherein:
the first set of mapping constraints of the token table generate tokenized subsets by replacing contiguous letter characters with contiguous letter characters having a corresponding length;
the second set of mapping constraints of the token table generate tokenized subsets by replacing contiguous number characters with randomized number tokens having a corresponding length; and
the third set of mapping constraints of the token table generate tokenized subsets by randomly incrementing or decreasing the determined temporal entry subset.

19. The method of claim 18, wherein:
the first set of mapping constraints of the token table generate tokenized subsets by replacing contiguous number characters with the second set of mapping constraints.

20. A non-transitory computer readable medium for tokenizing data, the computer readable medium comprising computer executable instructions for:
providing a dataset comprising a plurality of characters;
providing a token table for tokenizing datasets, the token table comprising mappings that define replacement tokens for characters in datasets, the token table comprising at least three mapping constraints; and
generating a tokenized dataset based on the dataset and the at least three mapping constraints by:
  determining whether subsets of the dataset comprise one of: alphanumerical strings, only numbers, or temporal entry;
  for each alphanumerical string subset, applying a first set of mapping constraints of the token table to replace the respective subset;
  for each only numbers subset, applying a second set of mapping constraints of the token table to replace the respective subset;
  for each temporal entry subset, applying a third set of mapping constraints of the token table to replace the respective subset; and
  generating the tokenized dataset by replacing each determined subset with the respective replacement subset.

* * * * *